March 19, 1963 E. P. WISE 3,081,984
THERMOSTATIC FUEL MIXTURE CONTROL
Filed Nov. 3, 1960 2 Sheets-Sheet 1
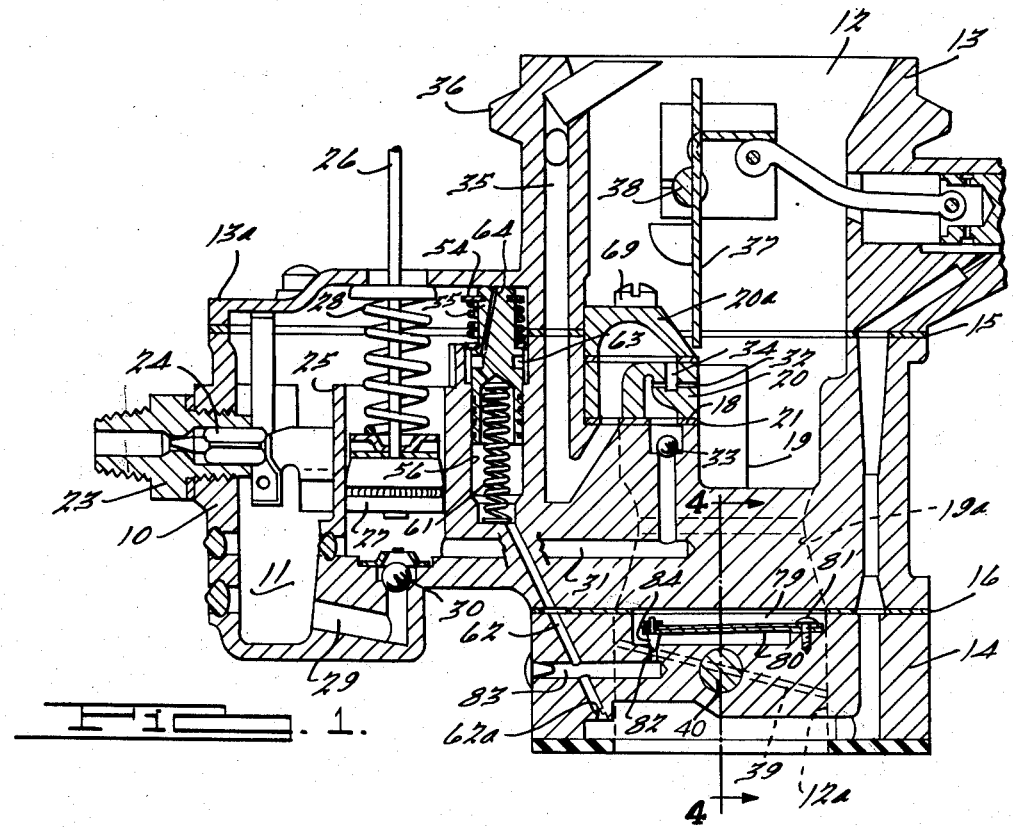
INVENTOR.
Eugene P. Wise.
BY Harness & Harris
ATTORNEYS March 19, 1963  E. P. WISE  3,081,984
THERMOSTATIC FUEL MIXTURE CONTROL
Filed Nov. 3, 1960  2 Sheets-Sheet 2
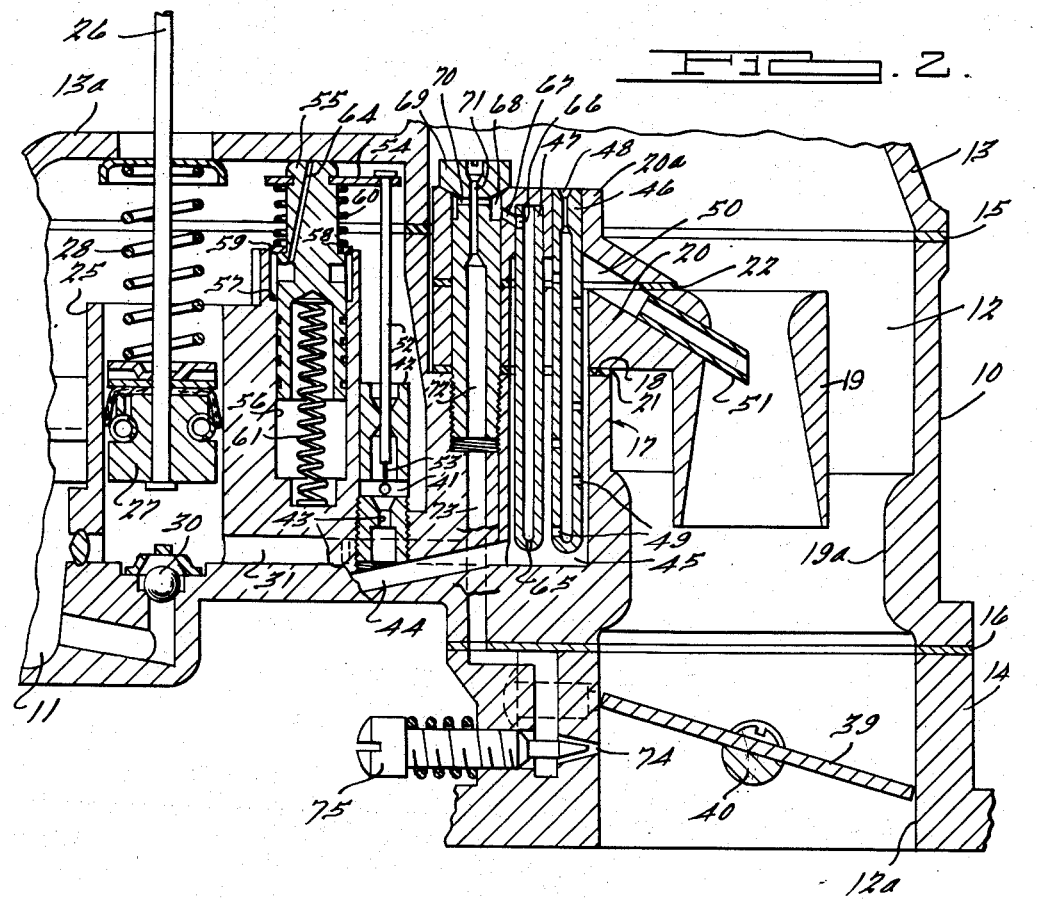
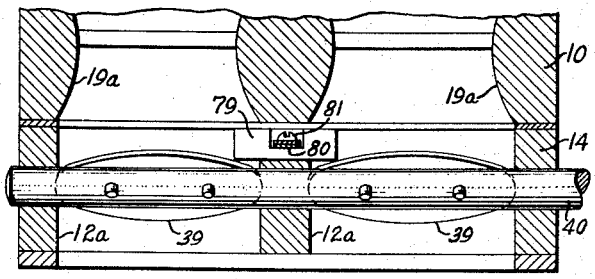
INVENTOR.
Eugene P. Wise
BY Harness & Harris
ATTORNEYS.

United States Patent Office 3,081,984
Patented Mar. 19, 1963

3,081,984
THERMOSTATIC FUEL MIXTURE CONTROL
Eugene P. Wise, Bloomfield Hills, Mich.
Filed Nov. 3, 1960, Ser. No. 67,095
2 Claims. (Cl. 261—23)

This invention relates to fuel charging systems for automotive engines and in particular to means in such a system, as for example a carburetor for controlling the fuel-air ratio to the engine in accordance with changes in the ambient atmosphere temperature.

In consequence of changes in the density of atmospheric air from winter to summer, difficulty has long been experienced in providing a comparatively simple fuel charging system for an automotive vehicle that will automatically adapt itself to both summer and winter driving. If the system is set for economical summer driving, then adjustment for fuel enrichment must be made when the ambient temperature falls below approximately 50° F. On the other hand, if the system is set for efficient use of high density air during cold winter operation, an excessively rich and wasteful fuel-air ratio will result during summertime driving when the air density drops.

An object of the present invention is therefore to provide a simple economical and highly efficient means in a fuel charging system for an automobile engine to supply a comparatively constant fuel-air ratio to the engine regardless of large thermally induced changes in atmospheric air density.

In a customary liquid fuel charging system, a throttle valve in an induction conduit controls the air supply to the engine. A vacuum actuated fuel control mechanism responsive to the pressure in the induction conduit downstream of the throttle valve controls the main fuel flow to the engine. Another object of the invention is to provide means responsive to the temperature of the air supplied to the induction conduit for changing the amount of pressure required therein downstream of the throttle valve to actuate the fuel control mechanism to effect any given rate of fuel flow, thereby to prevent undesirable leanness of the fuel-air mixture when the ambient atmospheric temperature is low and to prevent excessive enrichment when the ambient temperature is high.

Other and more specific objects are to provide such a mechanism having a vacuum pressure transmitting duct connecting the pressure actuated fuel control mechanism with the induction conduit at a location downstream of the throttle valve to actuate the fuel control mechanism to increase the fuel supply to the engine with increasing pressure at said location, a restricted bleed orifice connecting the pressure transmitting duct with the induction conduit upstream of the throttle valve, and thermostatic valve means responsive to the temperature of the air supplied to said induction conduit for opening said bleed orifice at a predetermined low temperature so as to raise the pressure in said pressure transmitting duct with respect to the lower operating pressure in said induction conduit at said downstream location, the thermostatic valve means being also operative to close the bleed orifice at a predetermined high temperature to enable the pressure in said pressure transmitting duct to correspond to said lower operating pressure at said downstream location. In consequence for any given pressure at said downstream location, the pressure in the pressure transmitting duct will be higher for low ambient temperatures than for high ambient temperatures and a desired fuel-air ratio will be predetermined regardless of the ambient temperature.

Another object is to provide an automobile carburetor of the above character having the usual throttle body defining the downstream end of the carburetor portion of the induction conduit and carrying the throttle valve, the thermostatic valve being contained in a recess formed in the throttle body in unrestricted communication with said induction conduit. Thus the thermostatic valve is located conveniently in communication with the air stream in the induction conduit, and in the two-barrel carburetor particularly is readily contained in the space between the two induction conduits.

Other objects of this invention will appear in the following description and appended claims, reference being had to the accompanying drawings forming a part of this specification wherein like reference characters designate corresponding parts in the several views.

FIGURE 1 is a fragmentary midsectional view through an automobile carburetor embodying the present invention.

FIGURE 2 is a fragmentary diagrammatic enlarged sectional view similar to FIGURE 1 but taken through the line of centers of one branch of the carburetor induction fuel system including the air vent, idle bleed tube, vacuum actuated stepup plunger and associated stepped needle, and the acceleration fuel pump.

FIGURE 3 is a graphic representation of the fuel-air ratio on the ordinate with respect to the air flow on the abscissa.

FIGURE 4 is a fragmentary sectional view taken in the direction of the arrows substantially along the line 4—4 of FIGURE 1.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring in more particularity to the drawings, a specific example of the present invention is illustrated by way of example in application with a two-barrel automobile carburetor having a body 10 partitioned into two main compartments including a fuel bowl 11 and an air induction conduit 12, reference being hereby made to copending application Serial No. 818,917, filed Jan. 8, 1959, for a more complete description of the structure and operation of such a carburetor. An upper air horn portion 13 of the carburetor body supplies air to the conduit 12 and is also provided with a cover extension 13a which overlies the fuel bowl. In the case of a two-barrel carburetor as in the present instance, the lower portion of the conduit 12 bifurcates into two parallel branches 12a connected by separate manifolds with the engine cylinders for supplying fuel and air thereto. A lower throttle body portion 14 of the carburetor is provided with parallel induction conduits which communicate with the downstream openings of the two branches 12a to comprise continuations thereof. Gaskets 15 and 16 space the central body portion of the carburetor from the upper air horn portion 13 and lower throttle body portion 14 respectively.

The fuel chamber 11 and induction conduit system 12 are separated by a wall 17 having a recessed upper portion providing a horizontal shelf or platform 18. The latter supports a venturi assembly including a pair of small venturis 19, one associated with each branch 12a of the induction conduit and opening into the upper region of a large venturi 19a formed in the associated induction branch 12a immediately above the throttle body 14. The paired small venturis 19 are supported by an extension 20 which overlies and is suitably secured to the platform 18, being spaced therefrom by a gasket 21. In the present instance the extension 20 comprises two parts including an upper portion 20a supported and spaced from the lower portion by a suitable gasket 22.

A tubular fuel inlet fitting 23 connected with a suitable source of pressurized fuel screws into the side wall of the bowl 11 to supply fuel thereto under the control of a customary float regulated valve 24. An acceleration fuel pump cylinder 25 is provided in bowl 11 in association with a vertically reciprocable plunger 26, which is operably connected with the fuel throttle so that when the latter is released, the plunger 26 and attached piston 27 are raised against the tension of spring 28, thereby to draw fuel into the lower portion of the cylinder 25 via conduit 29 and one-way check ball valve 30. In the event that the accelerator is depressed in a call for additional fuel, plunger 26 is released to enable spring 28 to force piston 27 down, thereby to force fuel from cylinder 25 through acceleration fuel supply conduit 31, formed partially in body 10 and extension 20, and thence into acceleration jet orifice 32 which opens from extension 20 into conduit 12 at a location between and adjacent the upper ends of the venturis 19.

A one-way check ball valve 33 prevents return flow of fuel in the line 31. Also a vent port 34 intersecting orifice 32 and in communication with the vent conduit 35 which extends through portions of the body 10 and air horn 13, prevents a syphon action through conduits 31 and 29. Vent conduit 35 opens into an upper portion of conduit 12 near the top of the air horn 13. The latter is provided with an annular boss 36 for attachment to an air filter whereby filtered air is supplied to conduit 12. Also the air horn portion of conduit 12 carries the usual vacuum and thermostatically controlled choke valve 37 mounted on a transverse pivot shaft 38 journalled at opposite ends in the air horn 13. Similarly, each of the induction conduit portions 12a in the throttle body 14 is provided with a throttle valve 39 secured to a common pivotal shaft 40 journalled in the throttle body 14.

In the present instance, each venturi 19 is associated with an independent main fuel supply, each similar to the other so that only one is described herein. As illustrated in FIGURE 2, each main fuel supply comprises a plurality of radially extending ports 41 opening from the bowl 11 into the interior of a vertically extending tubular guide member 42 which screws into a threaded bore in the base of bowl 11. A portion of the bore of the guide member 42 downstream of the ports 41 is restricted at 43 to provide a metering orifice which opens into a fuel supply conduit 44 in communication with the bottom of a fuel well 45. The latter is formed in the extensions 20 and 20a and in the wall 17 at the region of the platform 18 and contains a vertically extending vent tube 46 and idle bleed tube 47 secured at their upper ends within the extension portion 20a. The upper end of vent tube 46 is vented at 48 to the interior of induction conduit 12 at a location above the venturis 19 and is provided with a plurality of longitudinally spaced air discharge ports 49 opening into the well 45. The upper portion of well 45 is in communication with the interior of induction conduit 12 via a fuel supply conduit 50 formed partially in each of the extension portions 20 and 20a and terminating in a nozzle 51 which discharges into one of the small venturis 19.

In accordance with the structure described, the discharge end of nozzle 51 is subject to the volume of air flow through its associated venturi 19 so as to draw fuel from well 45 with increasing force as throttle valve 39 is progressively opened. In this action air is drawn through vent 48 and discharged into well 45 through the ports 49 to aerate the fuel within the well and to facilitate its flow toward nozzle 51.

In order to obtain fuel enrichment during operation of the engine at high load, as for example during acceleration, metering orifice 43 is controlled by a stepped rod or needle valve 52 registering coaxially with orifice 43, FIGURE 2, and having a lower end 53 of reduced cross sectional area. The upper end of rod 52 is secured to a cross arm 54 which in turn is secured to the upper end of a vacuum actuated plunger 55 slidable vertically within a tubular bore 56 formed in the body 10. An enlarged upper portion of the bore 56 provides an annular seat or shoulder 57. A reduced upper portion of the plunger 55 provides an annular shoulder 58 on which is seated a vertically slidable annular washer 59. The latter extends into the annular enlargement of bore 56 above the seat 57 and is adapted to seat thereon upon downward movement of plunger 55 as described below. A coil spring 60 around the upper end of plunger 55 and under compression between cross arm 54 and washer 59 urges the latter downwardly against the seat 58. A second coil spring 61 under compression between the bottom of bore 56 and plunger 55 yieldingly urges the latter upwardly.

Vacuum actuation of plunger 55 is accomplished by means of a pressure conducting duct 62 extending through portions of the bodies 10 and 14 and communicating with one of the conduit portions 12a downstream of the associated throttle valve 39, FIGURE 1. A restriction 62a in duct 62 enables control of the low pressure induced in chamber 56 at the underside of plunger 55 in response to low pressure downstream of throttle valve 39. An upper portion of the plunger 55 is provided with an outer annular groove 63 vented to atmospheric pressure at the upper portion of the fuel bowl by means of a duct 64 so as to prevent fuel from being drawn downwardly around the washer 59 and into the low pressure of chamber 56 below plunger 55.

The idle fuel system includes a restricted idle fuel supply port 65 opening into tube 47 adjacent the bottom of well 45. The upper end of tube 47 is provided with a radial port 66 in communication with duct 67 formed in extension 20a and communicating with an annular groove 68 extending around the outer periphery of the shank of a tubular screw 69. The latter extends downwardly through extensions 20 and 20a and screws into the platform 18 to secure the latter and extensions 20 and 20a securely together. A plurality of radial ports 70 extend from groove 68 to a restricted air vent duct 71 formed coaxially in screw 69 and opening at the top of the latter into the upper portion of conduit 12. The lower end of duct 71 communicates with a bore 72 extending coaxially downward through screw 69 and communicating with an idle bleed duct 73 formed in the bodies 10 and 14 and opening at 74 into the associated conduit portion 12a downstream of the throttle valve 39. Adjustment of the idle fuel may be accomplished by means of a conventional idle adjustment screw and valve assembly 75.

During operation of the engine at idle conditions when valve 39 is closed, a comparatively high vacuum exists at port 74, whereby fuel for supplying the engine requirements at idle conditions is sucked through conduits 72 and 73 from idle bleed tube 47 via port 66, ducts 67 and 70. Atomizing air for the idle fuel is supplied by the restricted vent duct 71. During idle condition, the low pressure downstream of valve 39 is also conducted via restricted conduit 62 into chamber 56 at the underside of plunger 55. The resulting low pressure below plunger 55 forces the latter downwardly, causing washer 59 to seat at 57 and compressing both springs 60 and 61 until the large diameter portion of rod 52 is moved into metering orifice 43 to effect optimum restriction thereof. Inasmuch as practically no air is flowing through the venturis 19, no appreciable fuel will be discharged from nozzles 51.

When throttle valve 39 is partially open, as for example during operation of the engine under steady state cruising conditions, the air flow through each small venturi 19 will be increased to draw fuel through the associated orifice 43 into conduit 44, well 45, and thence via conduit 50 to nozzle 51. During this state of operation, the low pressure downstream of valve 39 is still sufficient to compress both springs 60 and 61 and to maintain the large diameter portion of rod 52 within orifice 43. The condition of the fuel-air ratio supplied to the engine throughout the cruise range is illustrated by the solid line 76 of FIGURE 3.

As the engine load is increased and throttle valve 39 is progressively opened, as for example during moderate acceleration, the pressure downstream of valve 39 is increased to enable springs 60 and 61 to force plunger 55 upwardly until only the reduced diameter portion 53 extends within the metering orifice 43. During this condition of operation which is illustrated in FIGURE 3 by a solid line 77 representing the fuel-air ratio supplied to the engine during conditions of partial acceleration, washer 59 moves above shoulder 57 and carries the force of spring 60.

Finally when the throttle is in the wide open condition for full engine load, the maximum pressure is attained downstream of valve 39 and spring 61 is enabled to move plunger 55 upwardly until the restricted portion 53 is withdrawn completely from orifice 43, as illustrated in FIGURE 2. The fuel-air ratio during this condition of operation is represented by solid line 78 of FIGURE 3.

The two springs 60 and 61 are employed to give the desired non-linear spring reaction to the vacuum force acting on plunger 55. The latter force drops off sharply from the idle condition as the throttle valve 39 first opens, then drops off more gradually as the throttle valve 39 continues to open. During engine operation at high vacuum downstream of valve 39, the annular washer 59 seats at 57 to cause compression of spring 60 approximately concurrently with movement of the large diameter portion of rod 52 into the metering port 43.

In order to prevent objectionable leanness of the fuel-air mixture during winter driving conditions when the air density is high, and to prevent excessive enrichment of the fuel-air mixture during summertime driving when the air density is low, a central recess 79 in unrestricted communication with the comparatively high pressure of conduit 12 above throttle valves 39 is formed in the throttle body 14 at a location between the two induction conduit portions 12a and slightly upstream of the throttle valves 39, FIGURE 1. A bimetallic thermostat element 80 is secured to the throttle body 14 within the recess 79 by means of screws 81. A restricted bleed port 82 is connected by means of a duct 83 in throttle body 14 with the pressure conducting duct 62. A valve 84 connected with the free end of thermostatic element 80 for operation thereby registers with the bleed port 82 to hold the latter normally closed when the engine is operating under conditions of comparatively warm ambient atmospheric air temperature.

Assuming now that the carburetor with port 82 closed is adjusted for optimum efficiency of operation during summertime operation, the dotted lines 85 and 86 in FIGURE 3 illustrate the effect of suddenly opening valve 84 so as to establish communication between conduit 62 and the comparatively high pressure of recess 79 without regard to the ambient temperature. Upon opening valve 84, air pressure from recess 79 immediately raises the pressure in conduit 62 and in bore 56 below plunger 55 by reason of the restriction 62a. Accordingly for any given low pressure downstream of throttle valve 39, the vacuum force urging plunger 55 downwardly will be decreased in comparison to the vacuum force acting on the plunger when port 82 is closed by valve 84.

Restriction 62a is dimensioned so that when port 82 is closed and the throttle valve 39 is partially open in the cruise range represented by line 76 in FIGURE 3, if port 82 is then opened without regard to temperature conditions, the resulting increased pressure in chamber 56 below plunger 55 would enable springs 60 and 61 to raise plunger 52 until only the reduced portion 53 extends within metering orifice 43, thereby to enrich the fuel-air mixture substantially as indicated by dotted line 85. Similarly if port 82 is opened without regard to temperature when throttle valve 39 is adjusted for the part acceleration condition represented by line 77 in FIGURE 3, the reduced pressure in chamber 56 below plunger 55 will enable spring 61 to raise rod 52 until the reduced end 53 is withdrawn completely from orifice 43, thereby to enrich the fuel-air mixture substantially to the value indicated by dotted line 86.

It is to be emphasized, however, that valve 84 is thermostatically controlled and opens only at a low temperature when the density of the ambient air is correspondingly high. Accordingly the increased fuel flow resulting from opening of valve 84 during normal operation will correspond to the increased air density and result in a substantially desired uniform fuel-air ratio as indicated by the solid lines 76, 77 and 78 in FIGURE 3.

In practice, the valve 84 progressively opens with decreasing temperature when the ambient air temperature drops below about 50° F. and is completely open when the ambient air temperature is approximately 20° F., so as to enable a substantially uniform fuel-air ratio in the fuel supplied to the engine throughout the normally encountered range of variations in the ambient air temperature. The thermostatic element 80 is located in the present instance in the throttle body both for convenience of location and because of its accessibility to the engine air supply which at the region of the recess 79 is closely related to the ambient air temperature. It will be apparent, however, that the temperature sensing means for valve 84 could be located in any convenient location responsive to the temperature of the ambient air entering the upper end of conduit 12.

I claim:

1. In a carburetor for an internal combustion engine, a carburetor body, an induction conduit extending through said body and bifurcating therein into two branches, a throttle valve in each of said branches and operable in unison for controlling the air flow in said induction conduit, fuel supply means for supplying fuel to said conduit at a location upstream of said valves, pressure actuated means cooperable with said fuel supply means for controlling the fuel supply to said conduit, said body having a cavity therein in communication with said induction conduit between said location and said throttle valves and located upstream of the throttle valves and between said two branches, pressure conducting means connecting the pressure of said induction conduit downstream of said throttle valves with said pressure actuated means to actuate the latter to increase the fuel supply to said engine with increasing pressure, a restricted air bleed connecting said cavity with said pressure conducting means to increase the pressure therein with respect to low pressure downstream of said throttle valves, and temperature responsive means cooperable with said bleed means, said temperature responsive means being located within said cavity and responsive to the temperature of the fuel-air mixture thereat to restrict said bleed means with increasing temperature, thereby to decrease the pressure at said one side and the fuel supply to said engine with increasing temperature.

2. In a carburetor for an internal combustion engine, a carburetor body including an upstream portion having said induction conduit extending therethrough and bifurcating therein into two parts, said body also including a downstream throttle body portion secured to said upstream portion and having said two conduit parts extending therethrough, a pair of throttle valves carried by said throttle body portion and located in the two conduit parts thereof respectively for controlling the air flow in said induction conduit, fuel supply means for supplying fuel to said conduits at a location upstream of said valves, pressure actuated means cooperable with said fuel supply means for controlling the fuel supply to said conduit, said body having a cavity therein in communication with said induction conduit between said location and said throttle valves and located between said two conduit parts upstream of said throttle valves at the juncture between the upstream and downstream portions of said body, pressure conducting means connecting the pressure of said induction conduit downstream of said throttle valves with said pressure actuated means to actuate the latter to increase the fuel supply to said engine with increasing pressure, a restricted air bleed connecting said cavity with said pressure conducting means to increase the pressure therein with respect to low pressure downstream of said throttle valves, and temperature responsive means cooperable with said bleed means, said temperature responsive means being located within said cavity and responsive to the temperature of the fuel-air mixture thereat to restrict said bleed means with increasing temperature, thereby to decrease the pressure at said one side and the fuel supply to said engine with increasing temperature.

References Cited in the file of this patent

UNITED STATES PATENTS

| | | |
|---|---|---|
| 2,598,450 | Shaff | May 27, 1952 |
| 2,711,885 | Moseley et al. | June 28, 1955 |
| 2,757,914 | Ball | Aug. 7, 1956 |
| 2,771,282 | Olson et al. | Nov. 20, 1956 |
| 2,873,958 | Dermond | Feb. 17, 1959 |
| 2,882,027 | Cook et al. | Apr. 14, 1959 |
| 2,969,965 | Braun | Jan. 31, 1961 |